United States Patent [19]
Sury

[11] 3,966,168
[45] June 29, 1976

[54] PRESSURE RESPONSIVE VALVE

[76] Inventor: Francis P. Sury, P.O. Box 353, St. Clairsville, Ohio 43950

[22] Filed: Dec. 18, 1973

[21] Appl. No.: 425,774

[52] U.S. Cl. .................................. 251/58; 251/62; 251/214
[51] Int. Cl.[2] .................. F16K 31/44; F16K 31/12
[58] Field of Search ............ 251/62, 63, 63.4, 63.5, 251/63.6, 58, 214, 228, 231, 232, 233, 234, 235, 236, 243; 137/498, 505.13, 517; 308/72, 187, 188; 277/30, 100; 74/526

[56] References Cited
UNITED STATES PATENTS

| | | | |
|---|---|---|---|
| 469,611 | 2/1892 | Tully | 137/498 |
| 913,650 | 2/1909 | Senter | 137/505.13 |
| 1,305,615 | 6/1919 | Mueller | 251/58 |
| 3,087,341 | 4/1963 | Hults | 251/235 |
| 3,122,162 | 2/1964 | Sands | 137/498 |
| 3,207,175 | 9/1965 | Pauly | 137/505.13 |
| 3,353,192 | 11/1967 | Christiansen | 251/235 |
| 3,472,480 | 10/1969 | Williams | 251/63 |
| 3,695,650 | 10/1972 | Stuck | 308/72 |
| 3,801,169 | 4/1974 | Mullen | 308/72 |
| R19,545 | 4/1935 | Temple | 251/231 |

FOREIGN PATENTS OR APPLICATIONS

| | | | |
|---|---|---|---|
| 14,506 | 12/1911 | France | 251/58 |
| 704,370 | 2/1954 | United Kingdom | 137/498 |

Primary Examiner—Martin P. Schwadron
Assistant Examiner—George I. Walton
Attorney, Agent, or Firm—Clarence A. O'Brien; Harvey B. Jacobson

[57] ABSTRACT

A valve for regulating flow in a flow passage with the valve actuating mechanism being isolated from contact with the material passing through the valve and being responsive to various external conditions and adjustments which enables the valve to be utilized in many installations. The valve includes a plug assembly disposed axially of the valve body and the plug assembly includes a hollow stem and transverse ports adjacent the head of the valve to define the flow path for material through the valve.

6 Claims, 6 Drawing Figures

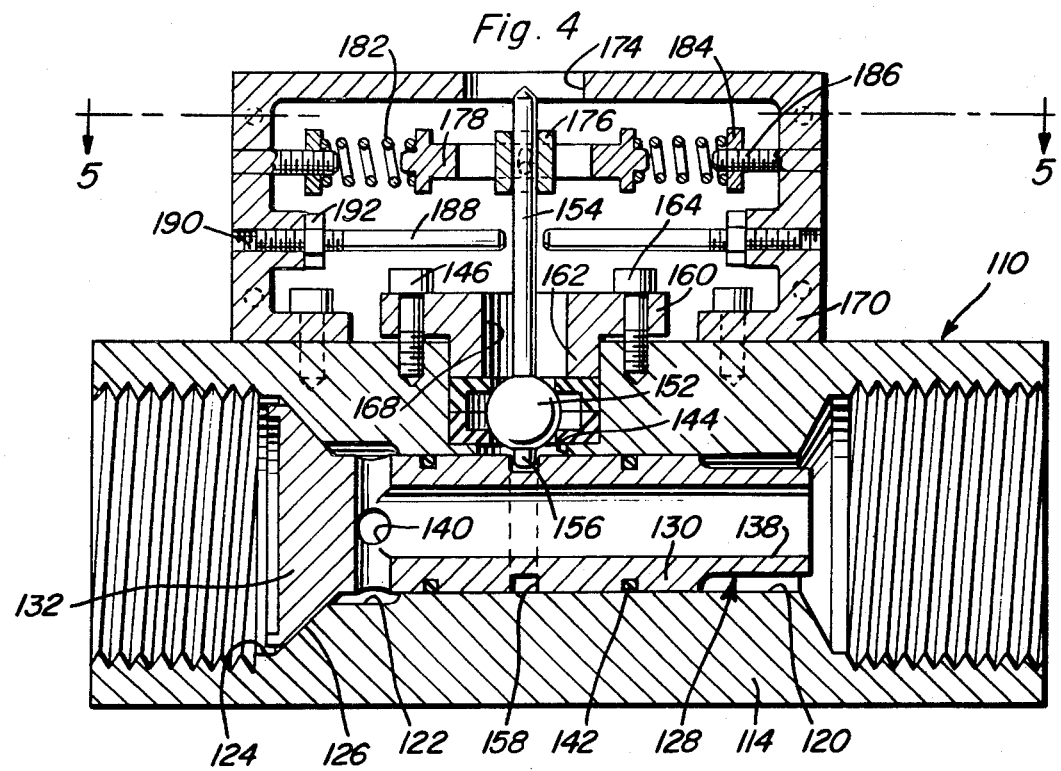
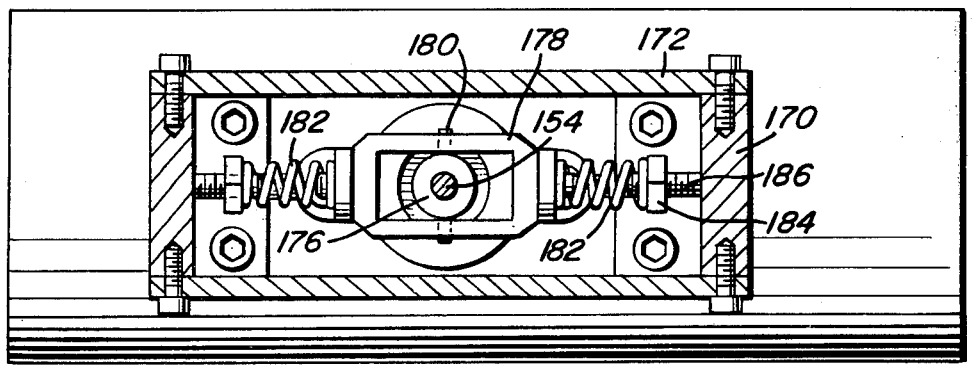
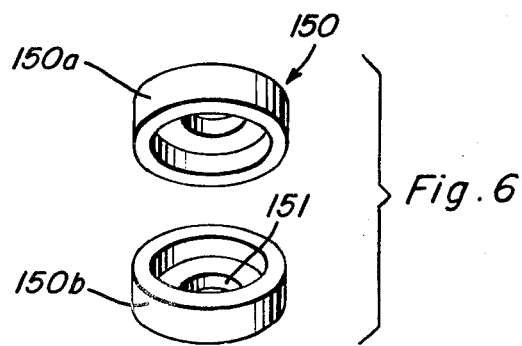

PRESSURE RESPONSIVE VALVE

BACKGROUND OF THE INVENTION

1. Field of the Invention

The present invention generally relates to valve structures and more particularly a regulating valve which can be used for various purposes and manually adjusted or automatically controlled for regulating flow and more particularly includes a plug assembly that is reciprocated by an actuating member that is pivotally supported by a ball and socket assembly and includes an inner end engaged with the plug assembly for reciprocating the plug assembly of the valve.

2. Description of the Prior Art

Valves of many and varied types are well known including regulating valves which are responsive to fluid pressure, temperature and spring bias or other means for maintaining the valve assembly in a particular condition for regulating flow. Such valves include various types of valve members including plug assemblies operated in various manners. Usually, such plug assemblies have an actuating mechanism which is at least partially in the flow of material which causes an obstruction to such flow and also causes reduced efficiency of the valve when the material flowing through the valve has adverse effect upon the actuating mechanism.

SUMMARY OF THE INVENTION

An object of the present invention is to provide a valve incorporating a longitudinal body and a longitudinally elongated plug assembly reciprocally mounted therein and actuated by a mechanism disposed externally of the valve body and extending into engagement with the plug assembly while being maintained in isolated relationship to the flow path through the valve.

Still another object of the invention is to provide a valve in accordance with the preceding object in which the plug assembly includes an axial flow path therethrough with the forward end of the flow path communicating with a transverse bore disposed inwardly of the valve head and inwardly of the valve seat on the valve body which the head of the valve engages in order to regulate flow so that the flow path when the plug assembly is in open position is between the valve head and valve seat, inwardly of the port or ports and longitudinally through the center of the plug assembly thereby isolating the flow path from the mechanism for actuating the plug assembly.

A further object of the present invention is to provide a valve in which the actuating mechanism includes a radially disposed stem having a ball member thereon received in a correspondingly shaped seat with the inner end of the stem engaged in a recess on the exterior of the plug assembly of the valve in order to reciprocate the plug assembly in response to pivotal movement of the stem in a longitudinal direction.

Yet another feature of the invention is to provide a valve in accordance with the preceding objects in which the stem is connected with an actuating mechanism or a control mechanism at the outer end thereof which can regulate the positioning of the valve plug assembly in response to various conditions or adjustments thereby enabling the valve to be effectively utilized in various installations.

A further important object of the invention is to provide a valve in accordance with the preceding objects in which the friction characteristics of the actuating mechanism may be reduced to a minimum by providing a lubricated housing for the ball on the stem with the lubricated housing being in the form of an annular channel-shaped member of plastic material having vertically spaced flanges forming a bearing surface with the ball and providing space for lubricant therebetween.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a longitudinal, sectional view of another embodiment of the valve.

FIG. 5 is a plan sectional view taken substantially upon a plane passing along section line 5—5 of FIG. 4 illustrating further structural details of the control or actuating mechanism for the valve.

FIG. 6 is an exploded group perspective view of the housing or socket for the ball member on the actuating stem for the valve plug assembly.

DESCRIPTION OF THE PREFERRED EMBODIMENTS

Figure 1:
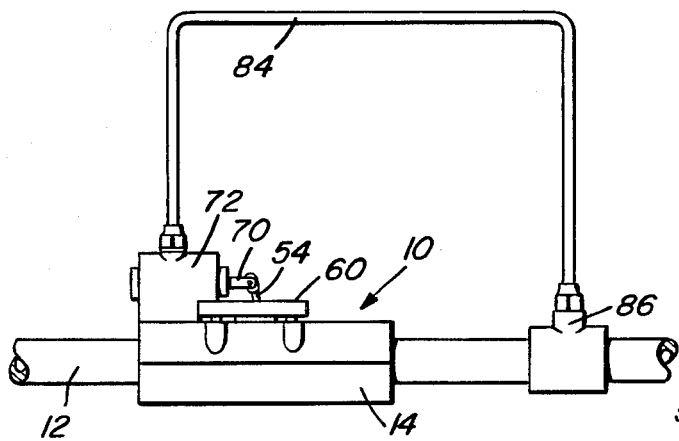
FIG. 1 is an elevational view of the valve of the present invention and illustrating one type of installation.
Figure 3:
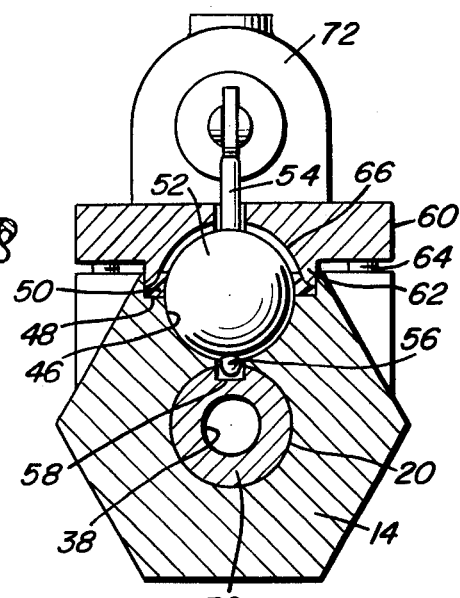
FIG. 3 is a transverse, sectional view taken substantially upon a plane passing along section line 3—3 of FIG. 2 illustrating further structural details of the valve.
Figure 2:
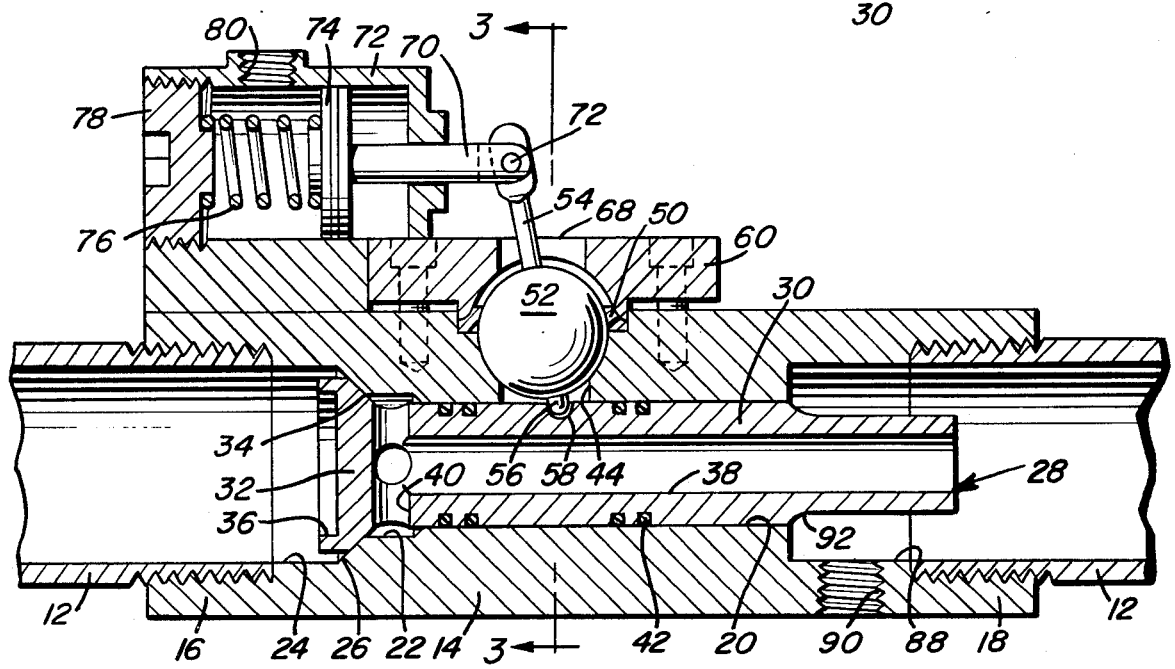
FIG. 2 is a longitudinal, sectional view of the valve illustrating the structural details and relationships of the components.

Referring now specifically to FIGS. 1—3 of the drawings, the valve of the present invention is generally designated by reference numeral 10 and is installed in a flow line or pipe 12. The valve 10 includes a longitudinally elongated body 14 having an internally threaded inlet end 16 connected to the pipe 12 and an internally threaded outlet end 18 also threadedly connected to the pipe 12 so that the valve body 14, in effect, is an insert in the flow pipe 12.

The valve body 14 may have any external configuration including the polygonal shape illustrated in FIG. 3 which facilitates reception of a wrench when assembling the valve and pipe. Also, the valve body 14 includes a tubular bore 20 extending therethrough with the tubular bore 20 being of constant diameter for a major portion of its length but the forward end of the bore 20 is provided with a slightly larger counterbore 22 and a still larger counterbore 24 at the inlet end of the body. The shoulder between the counterbores 22 and 24 is inclined and forms a valve seat 26 with the valve seat being substantially frusto-conical in configuration and defining a substantial area for providing an effective valve seat.

Disposed longitudinally in the bore 20 of the valve body 14 is a valve plug assembly generally designated by reference numeral 28 and which includes a cylindrical stem 30 that is substantially the same diameter as the bore 20 and is axially reciprocally mounted therein. The stem 30 includes an enlarged head 32 on the end thereof disposed adjacent the inlet end of the valve body 14. The head 32 is of larger diameter than the stem 30 and is received in the enlarged counterbore 24 with the shoulder defined between the stem 30 and the head 32 forming a frusto-conical valve seat engaging face 34 which has the same angle of inclination as the valve seat 26 to engage the valve seat 26 to control flow through the pipe 12. The valve head 32 is provided with a recess 36 in the face thereof which receives material flowing through the pipe 12 as it enters the valve 10. Rearwardly of the head 32, the valve stem 30 is provided with a longitudinal bore or passageway 38 extending to the opposite end thereof and discharging into the pipe 12. The forward end of the bore 38 is in communication with transversely extending ports 40 which are perpendicular to each other and perpendicular to the bore 38 for communicating the external surface of the valve plug 28, adjacent the head 32 with the inner axial bore 38. As illustrated, the counterbore 22 provides an annular chamber or recess surrounding the ports 40 to facilitate flow of material into the ports 40 when the valve head 32 is spaced from the valve seat 26. To seal the external periphery of the valve stem 30 with respect to the bore 20 in the valve body 14, the valve stem 30 is provided with longitudinally spaced pairs of O-ring seals 42 which may be constructed of Teflon, neoprene, or the like. As illustrated, the seals 42 are spaced longitudinally of the stem 30 and are disposed on opposite sides of a radial opening 44 formed in the valve body 14 so that the material flowing through the valve is prevented from having access to the radial opening 44.

The radial passageway 44 in the valve body 14 includes a generally semi-spherical outer portion 46 which communicates with the portion of the opening 44 that extends to the bore 20. This portion of the opening 44 is generally in the form of a longitudinal slot as illustrated in FIG. 3 and spherical portion 46 extends to the periphery of the body 14. The periphery of the body 14 surrounding the spherical portion 46 of the radial opening is provided with a cylindrical recess 48 receiving an annular seal ring 50 of Teflon, or the like, which cooperates with the spherical portion 46 to form a seat for a spherical ball 52 rigid with an intermediate portion of an operating stem 54 for the valve plug assembly 28. The end of the actuating stem assembly 54 inwardly of the spherical ball 52 forms a rounded projection 56 received in a recess 58 in the periphery of the valve stem 30 as illustrated in FIGS. 2 and 3. The projection 56 also is received in the slot-like opening 44 and is capable of fore and aft arcuate movement in response to fore and aft arcuate movement of the operating stem 54 above the ball 52. The depth of the recess 58 in the stem 30 is sufficient to enable such arcuate movement to occur and transmits such movement to the valve stem 30 for reciprocating the valve plug 28.

A retaining plate 60 is provided in overlying relation to the recess 48 and includes a depending lip 62 which telescopes into the recess 48 and retains the seal 50 in engagement with the ball 52 and retains the ball 52 in its socket. Screw threaded fasteners 64 are provided for adjusting the position of the plate 60 and enabling removal thereof with the central portion of the plate 60 including a partially spherical recess 66 receiving the upper portion of the ball 52 and a slot-like opening 68 receiving the stem 54. Thus, the sealing engagement and retention engagement of the components mounting the ball member 52 to the valve body 14 may be adjusted in any manner desired for proper operation.

For actuating the stem 54, the upper end thereof is pivotally connected to a piston rod 70 by a pin and slot connection 72. The piston rod 70 extends internally of a cylinder 72 rigidly fixed to the valve body 14 in any suitable manner with the inner end of the piston rod 70 being rigidly connected with a piston 74 reciprocal in the cylinder 72. A coil spring 76 is interposed between the piston 74 and a removable and adjustable plug 78 in the end of the cylinder 72 in opposed relation to the piston 74. A port 80 is provided in the cylinder 72 on the side of the piston 74 remote from the piston rod 70 with the port 80 being connected with a hose, conduit, pipe, or the like, 84 which extends to and is communicated with a T-fitting 86 in the pipe 12 on the discharge side of the valve 10, as illustrated in FIG. 1.

The discharge end of the valve body 14 is also provided with a counterbore 88 provided with a port 90 communicating radially therewith which may be provided with a plug or connected to a supply conduit for mixing material into the material flowing through the valve. The periphery of the end of the stem 30 which projects beyond the inner end of the bore 88 is reduced as at 92 to further facilitate flow of additive material entering through the port 90.

With the pin or extension 56 engaging the valve plug 28 to reciprocate it, there is no obstruction to flow through the valve by the operating mechanism and the operating mechanism does not directly come into contact with the fluids passing through the valve. The sealing ring 50, such as Teflon, or the like, combined with the gland 60, 62 provides an effective seat for the ball and provides a safety factor by retaining any pressure in the event the seals 42 are rendered ineffective for any reason. This also enables adjustment of the frictional characteristics of the actuating mechanism in order to vary the sensitivity of the control mechanism.

As illustrated, the control mechanism is sensitive to downstream pressure which is illustrated as a typical arrangement. However, various pressure sensitive devices may be employed for controlling the position of the valve. For example, a diaphragm device may be provided that is communicated with either the downstream or upstream side or both sides of the valve to provide a desired discharge pressure. Spring devices may be provided on either side or both sides of the piston 74 to control pressure on the downstream side of the valve. If a temperature responsive valve is desired, a capillary tube and temperature responsive bulb may be provided to control flow through the valve in response to any temperature conditions that may be desired. Many and varied installational arrangements may be provided with the valve being controlled in response to any desired condition.

FIGS. 4–6 of the drawings illustrate another embodiment of the valve in which the valve body and the associated valve plug assembly are quite similar to that illustrated in FIGS. 1–3. In this construction, the valve is generally designated by numeral 110 and includes a valve body 114 having a bore 120 extending therethrough and communicating with counterbores 122 and 124 which define a valve seat 126 therebetween. The valve plug assembly 128 includes a valve stem 130 and a valve head 132 thereon with the stem 130 including a passageway or bore 138 therethrough communicating with ports 140 adjacent the valve head 132. Reciprocation of the valve plug assembly 128 within the bore 120 controls flow of fluid through the space between the valve head 132 and the valve seat 126, the ports 140 and the bore 138. Seal rings 142 are provided on the valve stem 132 which may be in the form of O-rings with the seal rings being disposed on opposite sides of the radial opening 144 in the valve body 114. Positioned in the recess 144 is a ball member 152 having an upwardly extending operating stem 154 rigid therewith and a downwardly extending projection 156 received in a peripheral recess or groove 158 in the valve stem 130, so that upon fore and aft rocking movement of the actuating stem 154, the valve plug assembly 128 will be reciprocated in the valve body 114.

The radial passageway 144 is provided with an enlarged cylindrical outer portion 146 which receives a seal assembly 150 and a packing plate or gland 160 engaged therewith with the gland 160 including a depending flange or lip 162 and bolts 164 varying the position of the packing gland 160. The packing gland or plate 160 is provided with an opening 168 providing for movement of the actuating stem 154.

The seal 150 is constructed of Teflon, or other suitable material, and includes a pair of annular facing cup-shaped members 150a and 150b, as illustrated in FIG. 6 with the inner surfaces of the closed end of each cup-shaped member having a frusto-conical surface 151 formed therein to define a partial seat for the spherical ball 152, thus serving to seal the ball and support it in position with very little friction. The space between the cup-shaped members defining the seal may be filled with a suitable lubricant to lubricate the ball member during pivotal movement thereof, thus further reducing the frictional characteristics of the control mechanism for the valve.

Disposed above the packing gland 160 is a housing 170 having removable side plates 172 associated therewith and an opening 174 in the top wall thereof with the upper end of the stem 154 being disposed in the opening 174 to enable observation of the position thereof. The upper end portion of the stem 154 is received in a slide 176 disposed within an open rectangular guide 178 with a pin construction 180 utilized to pivotally support the slide to the guide 178 with the pin extending through a slot in the actuating stem 154. The guide 178 is connected with springs 182 at the opposite ends thereof with the springs 182 engaging adjustment nuts 184 mounted on threaded stems 186 rigid with the end walls of the housing 170. Thus, by adjusting the position of the nuts 184, the resistance to pivotal movement of the stem 154 may be varied or the initial position or normal position of the valve plug 128 is open. The stem 154 and valve plug 128 may be set by varying the position of the threaded nuts 184 on the stems 186. Disposed below the stems 186, limit stems or pegs 188 are provided with the inner ends thereof spaced away from the stem 154 a desired amount to provide stops to limit the movement of the stem 154. The pegs 188 are threaded into screw threaded bores 190 in the housing 170 and provided with locknuts 192 to lock the pegs or stops 188 in position.

With the arrangement of the ball seal and adjustment control in FIGS. 4-6, the valve is substantially more responsive and has a minimum built-in friction with the opening and closing springs being independently adjustable to accurately control the regulating characteristics of the valve.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A valve comprising a longitudinally extending valve body disposed in a fluid flow line for controlling flow of fluid in the line, said valve body including a longitudinally extending bore therethrough forming a flow passage, a valve plug assembly longitudinally reciprocally mounted in the bore in the valve body, one end of said bore in the valve body including a valve seat, said valve plug assembly including an elongated stem slidable in the bore in the valve body and a head on one end of the stem including a valve face engageable with the valve seat on the valve body, said stem of the valve plug assembly including a longitudinal bore therein communicating with the end of the stem remote from the head, and transverse port means in the stem adjacent the head communicating the periphery of the valve stem with the bore therethrough for providing axial flow passage through the valve stem from a point adjacent the valve head whereby fluid flowing past the valve seat and valve face when spaced therefrom will flow through the port means and the bore in the valve stem, and valve actuating means isolated from contact with the flow of fluid through the valve including pivotal lever means actuating the valve plug assembly from a point intermediate the ends of the valve stem whereby the actuating means will not be in the flow path and will not be in direct contact with the material flowing past the valve, said actuating means includes an actuating stem extending generally radially from the valve stem, said actuating stem having a ball member mounted on the end portion thereof adjacent the valve stem, a projection on the ball member remote from the actuating stem, said valve stem having a peripheral groove therein receiving said projection, means sealingly mounting the ball member on the actuating stem in the valve body whereby longitudinal pivotal movement of the actuating stem will cause longitudinal reciprocation of the valve plug assembly for controlling the flow of fluid through the valve, and said valve stem includes spaced seal means interposed between the periphery of the valve stem and the bore in the valve body on each side of the groove for isolating the actuating stem from the fluid flow.

2. The structure as defined in claim 1 wherein said means mounting the ball member in the body includes a radial recess in said body receiving the ball member, seal means disposed in the recess in sealing contact with the ball member, and gland means engaging the seal means for maintaining contact between the seal means and ball member.

3. The structure as defined in claim 2 wherein said seal means includes an annular member of plastic material of generally channel-shaped configuration and defined by two identical facing cup-shaped annular members engaging the ball member adjacent the actuating stem and projection respectively for supporting the ball member in the recess, each of said cup-shaped members including a cylindrical wall and a circular disc having a central aperture therethrough receiving the actuating stem and projection respectively.

4. The structure as defined in claim 3 together with means controlling movement of the actuating stem for biasing said actuating stem to a desired position in relation to the valve body for regulating the position of the valve plug assembly and regulating the flow of fluid therethrough.

5. The structure as defined in claim 4 wherein said means controlling movement of the actuating stem includes a pair of opposed springs operatively associated with the actuating stem for biasing the actuating stem to a desired position, means adjusting the tension on the springs for enabling variation in the adjusted position of the valve plug assembly, and adjustable means forming limit stops for movement of the actuating stem.

6. The structure as defined in claim 5 wherein the periphery of the aperture in the circular disc of each of the cup-shaped members is generally frusto-conical with the larger diameter disposed inwardly for engaging a segment of the peripheral surface of the ball member, the end edges of the cylindrical walls of the cup-shaped members being disposed in adjacent relation and in spaced relation to the periphery of the ball member for defining a peripheral recess around the ball member adapted to receive lubricant, said valve body including a housing connected thereto and including a hollow interior receiving the portion of the actuating stem projecting above the gland means, said pair of opposed springs being disposed in said housing and oriented on opposite sides of the actuating stem, said means for adjusting the tension on the springs including threaded members engaged with opposite sides of the housing and engaging the ends of the springs remote from the actuating stem, said actuating stem including a pivotal adapter slidable on the actuating stem and engaging the ends of the springs adjacent the actuating stem to enable rocking movement of the actuating stem while maintaining the springs in opposed aligned relation, said means forming limit stops for the actuating stem including oppositely oriented threaded rods adjustably threaded into the housing and including inwardly disposed ends spaced adjustably from opposite sides of the actuating stem to limit the rocking movement of the actuating stem.

* * * * *